United States Patent [19]

Pujari et al.

[11] Patent Number: 5,001,091

[45] Date of Patent: Mar. 19, 1991

[54] READILY MOLDABLE OR CASTABLE CERAMIC POWDERS

[75] Inventors: Vimal K. Pujari, Northboro; Raymond L. Fournier, Southbridge, both of Mass.

[73] Assignee: Norton Company, Worcester, Mass.

[21] Appl. No.: 321,029

[22] Filed: Mar. 9, 1989

Related U.S. Application Data

[63] Continuation-in-part of Ser. No. 115,804, Nov. 2, 1987, abandoned, which is a continuation-in-part of Ser. No. 861,955, May 12, 1986, abandoned, which is a continuation-in-part of Ser. No. 822,454, Jan. 27, 1986, abandoned.

[51] Int. Cl.$^5$ ............................................. C04B 35/48
[52] U.S. Cl. ..................................... 501/103; 501/87; 501/88; 501/96; 501/97; 501/108; 501/126; 501/127; 428/403; 428/404; 428/220
[58] Field of Search ....................... 501/87, 88, 96, 97, 501/103, 108, 126, 127; 428/403, 404; 427/220

[56] References Cited

U.S. PATENT DOCUMENTS

| | | | |
|---|---|---|---|
| 4,144,207 | 3/1979 | Ohnsorg | 501/90 |
| 4,207,226 | 6/1980 | Storm | 501/88 |
| 4,289,720 | 9/1981 | Yajima et al. | 501/97 |
| 4,485,182 | 11/1984 | Enomoto et al. | 501/97 |
| 4,530,808 | 7/1985 | Renlund et al. | 501/90 |
| 4,551,496 | 11/1985 | Renlund et al. | 501/90 |

*Primary Examiner*—William R. Dixon, Jr.
*Assistant Examiner*—Anthony J. Green
*Attorney, Agent, or Firm*—Arthur A. Loiselle, Jr.

[57] ABSTRACT

Ceramic molding or casting powders, particularly nitride, oxide and carbide powders, that have substantial internal surface and volume produce improved dispersions after being coated with a cover material, such as polyethylene glycol, that reduces the specific surface area of the powder by at least about 10% and reduces the amount of penentration of the binder used for dispersion into the internal volume of the powder. The viscosity of dispersions of such coated powders, or of conventional uncoated ceramic powders, can be further reduced by treatment of the powders with organotitanate, organozirconate, or organosilane coupling agents that are chosen to interact favorably with the specific powders and binders used.

12 Claims, No Drawings

READILY MOLDABLE OR CASTABLE CERAMIC POWDERS

CROSS REFERENCE TO RELATED APPLICATIONS

This is a continuation-in-part of Application Serial No 115,804, filed Nov. 2, 1987, which was a continuation-in-part of Application Serial No. 861,955, filed May 12, 1986, and now abandoned, which was a continuation-in-part of Application Ser. No. 822,454, filed Jan. 27, 1986, and now abandoned.

TECHNICAL FIELD

This invention relates to dispersions of ceramic powders, particularly oxide, nitride, and carbide powders, that are starting materials for directly useful ceramic objects. More particularly, this invention relates to additives that increase the facility with which the dispersions can be shaped, to the dispersions, thus made, processes for making and using the dispersions, and the products made by using such dispersions.

TECHNICAL BACKGROUND

One of the most common and economical methods of making ceramic bodies includes a step of shaping ceramic powder dispersions containing a fugitive binder. The binder serves to hold the shaped powder together at the molding temperature, and usually also at room temperature if that is different, in a coherent but usually fragile type of body known as a green body or greenware. (A ceramic body is often called "green" or "greenware" even at later stages of processing if it is still substantially more fragile than after final densification.) A green body is converted to a directly useful ceramic body by controlled heating, which both expels the binder by volatilization, combustion, or other chemicals of ceramic powder to bond to one another.

The process of expelling the binder is denoted as "dewaxing" (a customary term in the art, derived from the fact that binders are often waxes, but applicable even if the binder has some other chemical nature.) Any process of converting the ceramic content from separated or only weakly self-bonded powder to a strongly coherent body is denoted generally herein as "densification". This term thus embraces the distinct types of processes known as sintering (used herein to mean heating, without application of external pressure, at a sufficiently high temperature to cause the ceramic particles to bond together by any process that reduced the porosity of the body formed from the powder), uni-axial pressing, isostatic pressing, etc.

Dewaxing and densification sometimes proceed simultaneously, but more often there is little or no densification until dewaxing is complete, and almost always densification is begun or continued by heating dewaxed bodies at a higher temperature after dewaxing is complete.

Depending on the fraction of the dispersion which is ceramic, the characteristics of the the ceramic powder, and the times and temperatures used for densification, final products which are either impervious or have controlled porosity can be produced. Especially when impervious final products are desired, it is advantageous to have as high a ceramic powder content in the dispersion as is practicable, because the time required for densification is thereby reduced, as is the shrinkage of the body during densification. As a generalization, small particle size ceramic powders are preferred, because fine powders tend to densify more readily.

Despite the recognized advantages of both small particle size and high loadings of powders in dispersions, there is a practical limit on increasing both of these characteristics of dispersions, because small particle sizes and high loadings produce dispersions with high viscosity. A viscosity higher than 2000 poises (hereinafter abbreviated as "p") as measured by a capillary rheometer is considered impractical for commercial injection molding of complex shapes, and a viscosity range from 400–1000 p is generally preferred for this shaping technique. Still lower viscosity is preferred for slip casting.

It is customary in the art to measure the specific surface area of ceramic powders as a rough indication of the powder particle size. Very fine powders must have a high surface area as a consequence of the mathematical fact that the surface to volume ratio of any specific solid shape, such as a sphere, increases as the size of the solid decreases. However, it is well known in the art that part of the specific surface area of actual powders is not connected directly with the size of the powders but instead is due to internal porosity or to surface concavities. That part of the powder surface area due to the presence of concavities, pores, or the like is denoted herein as "internal surface", while the remainder of the powder surface area, that part that would remain if all such hollows were filled to give each powder particle a smooth flat or convex surface coinciding with the outermost portions of its actually surface, is denoted herein as "external surface."

Internal surface and its associated volume in ceramic molding powders is usually wholly undesirable, without any compensating benefits. Voids in the powder may result in pores in the final product, which are usually undesirable, or in unexpected and random mechanical failures, which are always undesirable. Internal surfaces adsorb surface active agents that may be added to the powders or dispersions to decrease viscosity. These surface active agents are usually expensive, so that the need to use more of them as a result of adsorption on internal surface can be a serious economic impediment to the use of powders with a high internal surface.

Another problem is that tortuously shaped internal cavities can trap binder if the only outlet(s) from a cavity become blocked by local densification before all the binder is expelled. Such trapped binder can result in residual carbon in the ceramic and/or result in mechanical failure of the bodies. Sometimes the hazard of trapping the binder can be avoided by increasing the processing times, but this also increases costs. Dewaxing times of a week or more have sometimes been reported, but such long times are rarely if ever practical for commercial use.

Another practical difficulty well known in the art is the inconsistency of molding results often obtained from one lot of powder to another. Because the amount of internal surface is subject to variations from factors that are not always adequately controlled during the manufacture of practical powders, it is a common experience that a recipe for a molding dispersion optimized for one lot of powder of a certain type often will prove unsuitable for a subsequent lot supposedly manufactured under identical conditions. This variability is believed to result from variations in the amount of internal surface from one powder lot to another.

Although all these disadvantages of internal surface and volume in ceramic molding powders have long been known in the art, the practical methods of producing molding powders of most ceramic compositions almost always yield powders with substantial amounts of internal surface and volume, and heretofore few if any means for overcoming the adverse effects of such powder have been known in the art.

One practically important example of a dispersion suitable for injection molding is a dispersion of silicon nitride powder in a paraffin, polystyrene, and/or polyethylene binder. In the prior art it has been noted that the maximum powder loading possible for such a dispersion, without exceeding practical viscosity limits for injection molding, is about 80% by weight (hereinafter "w/o") when the average silicon nitride particle size and specific surface area (hereinafter "SSA") are about 1 micron and 12–15 square meters per gram (herinafter "$m^2/g$") respectively. Powder loadings in the range of 85–87 w/o have been achieved with larger sized powders with an SSA of about 8 $m^2/g$, but such powders do not sinter as well as those with SSA's of at least 12 $m^2/g$. It has been found impractical to achieve final product densities of more than 98% of the theoretical maximum for silicon nitride when using the larger sized silicon nitride powders with which loadings over 80 w/o have been previously achieved. For impervious final ceramic products, the higher possible density is generally preferred.

U.S. Pat. No. 4,207,226 to Storm describes the use of titanate coupling agents to reduce the viscosity and increase the practical loading levels of fine silicon carbide powders in organic binders. The coupling agents are merely mixed into the organic binder components. The Storm teaching is directed only to the processing of sinterable metal carbides. (Cf. Storm column 1, lines 11–13 and column 3, line 41.) Similarly, U.S. Pat. No. 4,056,588 to Baniel teaches the use of coupling agents for oxide and carbide ceramics.

Because of the particularity of surface effects in chemistry generally, it is not considered that teachings for the processing of carbides and/or oxides makes obvious the ability of the same materials to improve the processing of silicon nitride. This is especially true because it is believed that powder dispersion is controlled primarily by acid-base interactions among the powder, the dispersion medium, and any dispersing aids used, and because the surface of silicon nitride is generally basic while the surface of silicon carbide is generally acidic.

SUMMARY OF THE INVENTION

It has been found that the difficulties arising from the presence of internal surface and volume in ceramic powders, particularly nitride, oxide, and carbide ceramic powders, can be significantly ameliorated by adding to the dispersion a suitable material, denoted herein as a "cover material". The cover material of this invention is a material which is capable of reducing the SSA of the ceramic powder with which it is used by at least 10% of its original value and which can be substantially completely expelled from the powder with which it is used during dewaxing, so that no significant amount of residue from the cover material will be present in the directly useful ceramic bodies made from the dispersions after they are formed by densification. The cover material is added to the dispersions by coating the powder with it before the powder is dispersed in the usual binders.

An important advantage of coating powders according to the instant invention is that after a proper amount of the cover material has been applied, powders with differing amounts of internal surface behave more similarly in dispersions than do powders without the coating as taught herein. Thus powders coated according to this invention can be processed with significantly greater consistency of results.

A cover material as described herein is applicable to any ceramic powder with a significant amount of internal surface. The cover material should have adequate adhesion to the ceramic powder to be coated, but in general the minimum amount of adhesion required is relatively low and readily obtainable.

It has also been found that the loading of oxide, nitride, and carbide ceramic powders, especially silicon nitride, silicon carbide, and zirconia powders in thermoplastic binders can be increased significantly, without thereby increasing the viscosity of the dispersion to an impractical level, by use of a suitable organometallic coupling agent in the dispersion. A coupling agent is defined herein as a material which does not significantly reduce the SSA of a ceramic powder when dispersed thereon, but does, when present in dispersions of the oxide, nitride, and carbide ceramic powders in amounts up to a maximum of about 5 w/o of the ceramic, decrease the viscosity of the dispersion to below that of a dispersion of the same equivalent weight of the other constituents in the same dispersion medium.

A coupling agent according to this invention must be chosen with knowledge of the powder and the binder which it is to be used, because the beneficial effects of the coupling agent appear to depend on a type of absorption on the powder, which depends on specific chemical interactions with the powder and can be inhibited by properties of the binder, e.g. if the binder competes as an adsorbate.

For injection molding, the loading of one micron size silicon nitride powders in a conventional binder containing paraffin and polyolefins can be increased from 80 w/o to 87 w/o by addition of about 0.3–5.0 w/o of some organosilanes, organotitanates or organozirconates to the dispersion. As a result of higher loadings, the time for dewaxing a green body and the shrinkage and likelihood of cracking a green body during its conversion into a final silicon nitride ceramic body are all reduced. Similar advantages can be obtained for zirconia powders and for other oxide, carbide, and nitride powders, with the same or different organometallic coupling agents.

It is usually advantageous to use both a cover material and a coupling agent to make dispersions from any particular powder, if a suitable coupling agent is known.

Similar advantages can be achieved by using cover materials and/or coupling agents when slip casting is used to form the green body instead of injection molding, although total loading levels are lower for slip casting than for injection molding, as known in the prior art.

DESCRIPTION OF THE PREFERRED EMBODIMENTS

The present invention is applicable to all powders which contain internal surfaces and corresponding internal volume. The powders may be of any specific composition, but will generally be ceramic or metal powders. Particularly, the present invention is applicable to nitride, oxide, and/or carbide ceramic powders. Examples of suitable such ceramics include, but are not limited to, silicon nitride, aluminum nitride, boron nitride, titanium nitride, zirconium oxide, aluminum oxide, mullite, magnesium oxide, silicon carbide, boron arbide, titanium carbide, sialon, and mixtures thereof.

If the cover material is to be applied in essentially pure form, it should be a liquid and have a relatively low viscosity and spreading wetting angle against the powder at some suitable temperature for coating, so that the cover material can readily fill in at least the outer portions of the cavities and/or pores in the surfaces of the powder particles. Alternatively, the cover material may be dissolved in a volatile solvent and applied to the powder from solution Any solvent that may be used to apply the cover material should be readily driven out of the cavities during drying, dewaxing, and/or densification without leaving any significant amount of residue, and should be free from any significant tendency to react chemically with the ceramic being coated.

The amount of cover material used can be determined readily by experiment for each type of powder: a sufficient amount of cover material to reduce the SSA of the powder by at least 10% should be used, and generally enough cover material to reduce the SSA as much as possible is most preferable.

The oligomers and polymers of ethylene glycol and the polymers of ethylene oxide are suitable cover materials. The preferred cover material is a polyethylene glycol, with one having a molecular weight of about 2000 being satisfactory and the most preferred being one of about 8000 molecular weight. Such a product is sold under the name Carbowax PEG 8000 by Union Carbide Corporation. Examples of the use of this preferred cover material are given immediately below.

EXAMPLE 1

For this example, silicon nitride powder commercially supplied by Kemanord was used. The powder had a nominal average particle size of 1.2 micron. When an additive as shown in the table below was used, the additive was dissolved in methanol (12 grams of additive mixed with 100 ml of methanol was the preferred amount) and the solution sprayed on the powder, which was then dried in an oven at 60-100 for 24 hrs. The amount of additive used was 1 w/o of the silicon nitride. Surface areas of powders were measured, either before or after treatment, by the conventional BET gas absorption method. Results are shown in Table 1 below for two lots of powder.

TABLE 1

| Effect of Powder Treatments on Specific Surface Area | | |
|---|---|---|
| | Specific Surface Areas | |
| Powder Condition | Powder Lot 1 | Powder Lot 2 |
| As received | 12.9 | 11.4 |
| After coating with 1 w/o PEG 8000 only | 11.1 | 9.6 |
| After coating with 1 w/o stearic acid only | 9.9 | 9.1 |
| After coating with 1 w/o LICA 12 cnly | 13.0 | 11.0 |
| After coating with 1 w/o PEG 8000 followed by a second coating with 1 w/o LICA 12 | — | 10.1 |

The precision of the SSA measurements shown in Table 1 is about 5%. Thus it is clear that LICA 12, the chemical structure of which is set forth below, does not function as a cover material according to this invention, because the SSA of powders treated with LICA either increases or stays the same within experimental error. PEG 8000, on the other hand, reduces the SSA of this particular type of powder about 15%. It was also found experimentally that PEG 8000 could be readily expelled from the powder during dewaxing without leaving any deleterious residue, and thus is an effective cover material according to this invention. Stearic acid, although it reduces the surface area as shown in Table 1, is not a satisfactory cover material, because experimentally it has been found not to be completely expelled from ceramic powders during dewaxing.

PEG 8000 is also an effective cover material for zirconia, as shown by Example 2 below.

EXAMPLE 2

A sample of a sinterable powder of zirconia with about 4.5 w/o yttria was coated with 1 w/o of PEG 8000 by the same method as described in Example 1. The SSA of the powder before coating was 6.7 m$^2$/g, and after coating the SSA was 3.6 m$^2$/g. Zirconia powder coated in this way could be dried, shaped, dewaxed, and densified without producing any deleterious residue from the PEG 8000.

(END OF EXAMPLE)

The preferred orqanometallic coupling agents for silicon nitride or zirconia powders in paraffin polyolefin binders may be described by the general formula $R_a$—$Z(O$-$X_b$—$Q_c)_d$, wherein R and Q represent organic groups, typically alkyl, alkoxyl, or aminoalkyl groups having 1-25 carbon atoms, and R and Q may be the same or different; o represents an oxygen atom; Z represents an atom of either titanium or zirconium; X represents an inorganic atom or group; a is an integer between 1 and 4, d is an integer between 1 and 4, and the a+d=4; b is either 0 or 1; and c is an integer between 1 and 4, and the a+d=4; b is either 0 or 1; and c is an integer between 1 and 4. Preferably, 0—X is selected from the group consisting of phosphate, phosphite, pyrophosate, or sulfate.

For silicon nitride powders, R in the general formula should be a group that is easily displaced by reaction with protons, because the additive is believed to attach strongly to the silicon nitride powder by protolytic cleavage of this bond and the formation of a bond to the particle in its place. The source of protons for this reaction is believed to be surface compounds formed spontaneously on silicon nitride powder in the presence of moist air. Q preferably has at least six carbon atoms, so as to provide, via van der Waals entanglement, substantial free volume for internal lubricity and good processing characteristics for the dispersion.

These organometallic coupling agents are useful with silicon nitride powders having SSA's between about 1 and 15 m$^2$/g, but are most useful for powders with areas between 8, and 15 m$^2$/g.

The organometallic coupling agent may be dissolved in the molten binder, but preferably it is dispersed over the surface of the silicon nitride powder before adding the latter to the binder. This dispersion can be accomplished by dissolving the coupling agent in a volatile solvent, spraying this solution on the powder or slurrying the powder in the solution, and then driving off the solvent.

For injection molding, a silicon nitride powder loading in a paraffin-polyolefin binder of about 82–85 w/o is preferred. For slip casting, a lower powder loading up to about 60 w/o is preferred. At a given loading level, viscosities of casting slips were decreased about one-third from the values obtained without using any coupling agent.

The most preferred coupling agent for silicon nitride powders made by nitriding silicon powder is isopropyl tri(dioctyl phosphate) titanate, with the trade name LICA 12. This is most preferably used at the level of 0.5 w/o of the silicon nitride powder, for powders with an SSA of about 12 m$^2$/g. Other effective coupling agents for silicon nitride powders in the preferred paraffin-polyolefin binders include iso-propyl tris(dodecylbenzene) sulfonyl titanated, with the trade names KR 9S, CAVCO MOD M-1 (described by its supplier as a "meth-acrylate/oleophilic functional zirccaluminate chloride hydroxide polymer"), and CAVCO MOD F (described by its supplier as an "oleophilic zircoaluminate chloride hydroxide polymer"). Both LICA 12 and KR 9S are available from Kenrich Petrochemicals Inc., Bayonne, New Jersey, USA. The two CAVCO materials are sold by Cavedon Chemical Co., Woonsocket, Rhode Island; their precise formulas are proprietary. For LICA 12, R in the general formula is isopropyl, a is 1, Z is Ti, X is $PO_3$, b is 1, Q is n-octyl, c is 2 and d is 3. For KR 9s, X is $SO_3$, Q is 3-dodecylphenyl, and the other choices are the same as for LICA 12.

Using both a coupling agent and a cover material according to this invention is generally highly preferred. A coupling agent is often capable of giving greater reduction in viscosity when used alone than is a cover material. The cover material permits use of less coupling agent to obtain the same amount of viscosity reduction, an important economic factor in view of the high cost of most coupling agents. Practice of the invention using both a cover material and a coupling agent can be further appreciated from the following examples.

EXAMPLE 3

All of the dispersions in this example were formulated from a single sample of silicon nitride powder having an average particle size of about 1.2 microns and a SSA of 12–15 m$^2$/g. Coupling agents used were dissolved in methanol; this solution was then sprayed onto the powder, and the sprayed powder was subsequently dried in an oven at 60°–100° for 24 hours. The amount of solution of coupling agent was chosen to give 1 w/o of coupling agent on the silicon nitride powder.

A conventional binder was prepared by melting together 11.0 parts of a paraffin wax with a melting point of 69° C., 1.5 parts of another paraffin wax with a melting point of 58° C., 1.0 parts of a low density polyethylene wax with a melting point of 107° C., and 1.5 parts of stearic acid. (All parts herein are by weight unless otherwise stated.) Treated or untreated silicon nitride powders were added to the molten binder and mixed with it using a conventional Brabender Mixer. The time required to obtain a mix ready for injection molding was noted and is shown in Table 2. Mixing and measurement of viscosity for all items shown in this table was at 140° C.

TABLE 2

MIXING TIME AND VISCOSITY OF SILICON NITRIDE POWDER WITH AND WITHOUT ADDITIVES ACCORDING TO THIS INVENTION.

| Powder Loading | Coupling Agent Used | Viscosity of Dispersion | Minutes of Mixing Time Needed |
|---|---|---|---|
| 82.5 w/o | None | 519 p | 28 |
| 82.5 w/o | KR 9S | 378 p | 21 |
| 82.5 w/o | LICA 12 | 254 p | 23 |
| 85.0 w/o | None | 822 p | 33 |
| 85.0 w/o | KR 9S | 585 p | 22 |
| 85.0 w/o | LICA 12 | 448 p | 23 |

It is apparent from Table 2 that the use of coupling agents substantially reduces both dispersion viscosity and mixing time. The lower viscosity permits injection molding of more complex shapes, such as turbocharger rotors, which have been successfully molded from dispersions with a silicon nitride powder loading of as much as 87 w/o. For example, the dispersion shown in the last line of Table 2 was injection molded at 120° C. Under a pressure of 20 megapascals (MPa) to give a green body with a silicon nitride powder content of 85 w/o. The green body was conventionally dried and dewaxed, then hot isostatically pressed according to the methods taught in U.S. Pat. No. 4,446,100 for one hour at 1750° C. The final ceramic body thus produced had high density and minimal apparent flaws.

The dispersions shown in Table 2, and the green bodies molded or otherwise shaped from them, are free from any significant volume of void or gas filled space, so that the volume fractions of ceramic in the green body may be calculated from the weight fractions and the established or experimentally measured values of the densities of the ceramic powder and the binder mixture. For the particular materials shown in Table 2, 82.5 w/o of silicon nitride corresponds to 63 volume %. The 87 w/o dispersion that was suitable for injection molding of simpler shapes had 68 volume % silicon nitride. With 85 w/o and 87 w/o dispersion powder loading levels, it was found that the volume of the body, and therefore the volume fraction of ceramic in the body, did not change significantly during dewaxing. Most prior art practice with silicon nitride has yielded binder-containing green bodies with no more than 57 volume percent silicon nitride, and such bodies usually shrink, and all too often crack, during dewaxing and/or subsequent densification.

EXAMPLE 4

For this example, silicon nitride powder from a single lot having an average particle size of 1.2 microns and a SSA of 12m$^2$/g, including substantial internal surface, was used. The silicon nitride powder was milled with 4 w/0 yttria powder of the same approximate size before being dispersed in binder and/or treated with LICA, but after any treatment with PEG 8000, as shown below, and the yttria and silicon nitride were counted together as "silicon nitride" in the proportions and percentages shown for any step after this mixing of the tow materials was performed. Both Carbowax PEG 8000 and LICA 12, when used, were applied on the powder, sometimes previously treated with another additive. Sufficient solution was used to give an add-on weight of 1 w/o of the silicon nitride powder. After being sprayed with solution of either LICA or PEG 8000, powder was dried in an oven at 60°–100° C.

The binder consisted of 70 w/o of a paraffin wax with a melting point of 69° C., 10 w/o of another paraffin wax with a melting point of 58° C., 10 w/o of a low density polyethylene wax with a melting point of about 110° C., and 10 w/o of stearic acid. Samples of the silicon nitride powder with no coating, with only the cover material, with only the coupling agent, and with both cover material and coupling agent were mixed with molten binder at 130° C. A ratio of 15 parts of the total of binder, LICA 12, and PEG 8000 to 85 parts of the silicon nitride powder was used for each dispersion, so that the ratio of powder was used for each dispersion, so that the ratio of powder to all the constituents of the dispersion that were potentially liquid at the mixing temperature was constant in all cases.

The viscosities of the dispersions thus made were measured with a capillary rheometer at 140° C. The results are shown in Table 3.

TABLE 3

EFFECT OF POWDER TREATMENT ON DISPERSION VISCOSITY

| Powder Surface Treatment | Dispersion Viscosity, Poises |
| --- | --- |
| None | 1629 |
| After coating with 1 w/o PEG 8000 only | 993 |
| After coating with 1 w/o LICA 12 only | 448 |
| After coating with 1 w/o PEG 8000 followed by a second coating with 1 w/o LICA 12 | 312 |

The results in this table show that a significant reduction in viscosity can be achieved by using either the cover material or the coupling agent alone, but the lowest viscosity is achieved by using both together.

All the dispersions formed in this example, except the one with neither a cover material or a coupling agent for the powder, were suitable for injection molding to produce complex shaped ceramic components such as turbocharger rotors. Injection molded green bodies made from all these dispersions were dewaxed and hot isostatically pressed in a conventional manner to produce highly dense ceramic bodies.

EXAMPLE 5

The methods of this invention may be advantageously applied to silicon nitride powder made by the di-imide process. Such powder has greater chemical purity than the more conventional type of silicon nitride powder the previous examples in this application. The powder derived from the di-imide process, however, has been difficult to use for injection molding. The difficulty has been ascribed to both its low surface area and its relatively uniform particle size, the former making sintering difficult and the latter inhibiting high packing density.

The chemically derived silicon nitride powder used for this example was purchased from Ube Industries of Japan. It is available in three size grades, SNE02, SNE05, and SNE10, with SSA's of 2, 5, and 10 m$^2$/g respectively. By combining portions of each of these three size grades, it was possible to raise the packing density from the level of 58% obtained with the best of the three grades alone to 60%. This latter value was still inadequate for efficient injection molding, however.

Application of the materials and methods of this invention gave much better results with these powders derived from di-imide. Two mixtures were used: Mixture 5.1 had 80 w/o SNE02 and 20 w/o SNE10, while Mixture 5.2 had 50 w/o SNE02, 30 w/o SNE05, and 20 SNE10. Each mixture was coated with 1 w/o PEG 8000 by the methods already described for other powders above. The coated mixtures were then dry ball milled with silicon nitride milling media for 40 hours. Yttria in the amount of 4 w/o was then mixed with the milled coated powder, and this mixture was cold isostatically pressed into tile shapes. The tiles were finally isostatically pressed at 1840 for one hour to produce tiles with greater than 99.3% of theoretical density in both cases.

To make considerably more complex shapes than tiles, injection molding is usually preferred, and for this type of processing, a coupling agent as well as the cover material (PEG 8000 in the above example) is preferred coupling agent was a mixture of equal weights of LICA 12, with a structure already described above, and N-(2-aminoethyl)-3-aminopropyl trimethoxy silane, sold by Dow Corning, Midland, Mich. under the trade name Z 6020. Milled and pre-covered powders as described above were coated with 1 w/o of this mixed coupling agent by the method described in Example 4, then dispersed at 66 volume % in the same binder as described in Example 4. The resulting dispersions had a viscosity of 360 p at a shear rate of 565 sec$^{-1}$ for mixture 5.1 and 424 p at a shear rate of 260 sec$^{-1}$ for mixture 5.2. Thus both are in the range for high quality injection molding of complex shapes.

EXAMPLE 6

For the type of zirconia powder already described in Example 2, the preferred binder composition was substantially the same as that used for silicon nitride. PEG 8000 was again the preferred cover material, but the preferred coupling agent was LICA 38 (neo-alkoxy tris [dioctylpyrophosphato]titanate). LZ09 (neo-alkoxy tris [dodecylbenzene sulfonyl]zirconate) and AL 72 (vinyl tris [2-methoxyethoxy]silane) were also technically satisfactory coupling agents for zirconia powders, but LZ09 has an undesirable odor, and A172 did not reduce viscosity as much as LICA 38.

A 92 w/o zirconia powder loading in the binder shown in the previous paragraph had a viscosity of more than 4000 p, but a dispersion of the same powder with 1 w/o each of PEG 8000 cover material and LICA 38 coupling agent applied according to this invention, had a viscosity of only 345 p at 140 C. This dispersion could successfully be injection molded to produce a part with slots as narrow as 0.2mm by three mm deep in two orthogonal directions and other complex features that are generally difficult to mold. The 92 w/o zirconia dispersion had 64 volume % zirconia. It is believed that no previously known injection molded green body of zirconia has had more than 88 volume % zirconia.

EXAMPLE 7

Injection Molding of Silicon Carbide

Beta silicon carbide with 2 w/o carbon and 1 w/o boron was injection molded, dewaxed and sintered to greater than 96% of theoretical density (3.2 m/c4) with four point average Modulus of Rupture (MOR) measured to be 47 ksi.

The injection molding compound was prepared following the teachings of the present invention as described below.

Beta-SiC powder (Ibiden Corp.) with average particle size of about 1.0 um and doped with 2 w/o carbon and 1 w/o boron was coated with 1 w/o PEG 8000 as a cover material. In a separate test it had been discovered that OLOA 1200 (a surfactant prepared by reacting polyisobutylene succinic acid with diethylene triamine from Chevron Chemical Co.) was a suitable surfactant for silicon carbide powder since 1 w/o of it was found to reduce the viscosity of a silicon carbide suspension by two orders of magnitude. Therefore, following the procedure described above for other samples a coating of 1 w/o OLOA 1200 was applied to the previously precoated powder. This powder was subsequently mixed with a thermoplastic based binding (as described earlier) system using a high shear mixer. The powder/binder ratio was maintained at 85:15 w/o. The compounded material, which showed good mixing consistency was then injection molded into 3 mm×4 mm×50 mm rectangular test bars. These bars after x-ray examination were found to be fully dense and free of flaws.

Approximately 10 test bars were dewaxed and subsequently sintered to greater than 96% T.D. The bars were sintered at 2100° C. for 1 hr in an argon atmosphere. Sintered bars were machined into uniform cross-section and then tested in four point bending. The average strength from these bars was measured to be 47 ksi. The strength measured on the injection molded bars are comparable to values measured on dry pressed and sintered specimens.

What is claimed is:

1. In a ceramic powder selected from the group consisting of nitride and oxide ceramic powders having internal surface area and corresponding internal volume and generally suitable for dispersion in a binder to form a mixture suitable for shaping into ceramic greenware, the improvement which comprises the powder having a cover material deposited on its surfaces before forming a dispersion of the powder in the binder, said cover material being an organic material that (i) causes at least a 10% reduction in measured specific surface area of the powder when applied thereto, (ii) substantially reduces penetration of said binder into said internal volume of said powder when said powder is dispersed in said binder, and (iii) is substantially completely expelled from the powder when ceramic greenware produced from the powder is dewaxed.

2. The ceramic powder of claim 1, wherein the powder is selected from the group consisting essentially of silicon nitride, aluminum nitride, boron nitride, titanium nitride, zirconium oxide, aluminum oxide, mullite, magnesium oxide, sialon, and mixtures thereof.

3. The ceramic powder of claim 1, wherein said cover material is a polymer or oligomer of ethylene glycol or a polymer of ethylene oxide.

4. The ceramic powder of claim 1, wherein said cover material is a polyethylene glycol with a molecular weight of about 8000.

5. The ceramic powder of claim 1, wherein said ceramic powder additionally has deposited on its surface up to 5 weight % of a coupling agent effective for said powder in a binder comprising predominantly paraffin wax, polyethylene wax, or mixtures thereof.

6. The ceramic powder of claim 5, wherein said powder is predominantly composed of silicon nitride and said coupling agent consists essentially of one or more compounds with the molecular formula $R_a$—$Z(O$—$X$—$b$—$Q_c)_d$, wherein R and Q represent alkyl, amino-alkyl, or alkoxy groups having 1-25 carbon atoms and R and Q may be the same or different; O represents an oxygen atom; Z represents an atom of silicon, titanium or zirconium; b is either 0 or 1, and if b is 1, O—X is selected from the group consisting of phosphate, phosphite, pyrophosphate, and sulfate; a is an integer between 1 and 4, d is an integer between 1 and 4, and $a+d=4$; and c is an integer between 1 and 4.

7. The ceramic powder of claim 5, wherein said ceramic powder is predominantly composed of zirconia and said coupling agent consists essentially of one or more compounds with the molecular formula $R_a$—$Z$—$(O$—$X_b$—$Q_c)_d$, wherein R and Q represent alkyl, amino-alkyl, or alkoxy groups having 1-25 carbon atoms, and R and Q may be the same or different; O represents an oxygen atom; Z represents an atom of titanium, zirconium, or silicon; b is either 0 or 1, and if b is 1, O—X is selected from the group consisting of phosphate, phosphite, pyrophosphate, and sulfate; a is an integer between 1 and 4, d is an integer between 1 and 4, and $a+d=4$; and c is an integer between 1 and 4.

8. In a coherent body formed by the injection molding of a composition comprising from 60-90 volume % of a ceramic powder selected from the group consisting of nitride and oxide ceramic powders in combination with an organic binder therefor, the improvement comprising the ceramic powder being coated with a cover material which is an organic material which (i) causes at least a 10% reduction in measured specific surface area of the powder when applied thereto, (ii) substantially reduces penetration of said binder into internal pores of said powder when said powder is dispersed in said binder, and (iii) is substantially completely expelled from the coherent body when said body is dewaxed.

9. The coherent body of claim 8 wherein the ceramic powder is selected from the group consisting essentially of silicon nitride, aluminum nitride, boron nitride, titanium nitride, zirconium oxide, aluminum oxide, mullite, magnesium oxide, sialon, and mixtures thereof.

10. The coherent body of claim 8 wherein said binder comprises paraffins, polyolefins, and mixtures thereof.

11. The coherent body of claim 8 wherein the ceramic powder further is coated with up to about 5% of a coupling agent effective to reduce the viscosity of said powder when combined with said organic binder.

12. A ceramic carbide powder selected from the group consisting of silicon carbide, boron carbide, and titanium carbide, and prior to combining said powder with an organic binder having deposited on its surfaces (a) an organic material which (i) causes at least a 10% reduction in measured specific surface area of the powder and (ii) substantially reduces penetration of a binder for said powder into said powder and (b) a coupling agent effective for said powder which agent reduces the viscosity of a dispersion of said powder in said organic binder.

* * * * *